(12) United States Patent
Sano et al.

(10) Patent No.: US 7,733,634 B2
(45) Date of Patent: Jun. 8, 2010

(54) MONITOR SYSTEM

(75) Inventors: Noriyuki Sano, Imaichi (JP); Hideto Katsunuma, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 1121 days.

(21) Appl. No.: 11/375,366

(22) Filed: Mar. 14, 2006

(65) Prior Publication Data

US 2006/0244700 A1    Nov. 2, 2006

(30) Foreign Application Priority Data

Mar. 15, 2005    (JP) .............................. 2005-072489

(51) Int. Cl.
G06F 1/16    (2006.01)
(52) U.S. Cl. ........................... 361/679.02; 248/280.11; 345/168; 206/301
(58) Field of Classification Search ............ 248/280.11, 248/205.1, 121, 450; 345/156, 87, 690, 84, 345/204, 168, 173; 361/679.1, 679.17, 679.21, 361/679.55, 679.44, 679.05; 455/414.3; 206/307.1, 301, 305, 232
See application file for complete search history.

(56) References Cited

U.S. PATENT DOCUMENTS 5,847,685 A    12/1998 Otsuki
5,967,479 A *    10/1999 Sweere et al. ............ 248/280.11
6,011,685 A    1/2000 Otsuki
2007/0176891 A1*    8/2007 Sano et al. ................. 345/156

FOREIGN PATENT DOCUMENTS

JP    06-064484    3/1994

\* cited by examiner

Primary Examiner—Hung V Duong
(74) Attorney, Agent, or Firm—Brinks Hofer Gilson & Lione

(57) ABSTRACT

A monitor system includes a display panel, a storage case receiving the display panel, a support member movable in the storage case, arm members, first guides in the storage case, and second guides in the support member. The support member rotatably supports the lower end of the display panel. Each arm member has a first supporting point, a second supporting point, and an intermediate supporting point. Each arm member is connected to the display panel through the first supporting point. The second supporting points of the arm members are engaged with the first guides. The intermediate supporting points thereof are engaged with the second guides. In the monitor system with this structure, when the support member is moved forward, the display panel can be rotated upward with a relatively small force such that the display panel is brought from a horizontal posture to a raised posture.

21 Claims, 14 Drawing Sheets

MONITOR SYSTEM

BACKGROUND OF THE INVENTION

1. Field of the Invention

The present invention relates to a monitor system having a display panel received in substantially a horizontal posture in a storage case, the display panel being projected out of an open front end of the storage case and being rotated upward to a raised posture when being used.

2. Description of the Related Art

Japanese Unexamined Patent Application Publication No. 6-64484 discloses a monitor system disposed in a console of a vehicle. This known monitor system has a display panel (display unit) received in substantially a horizontal posture in a storage case (fixed case). When the display panel is moved out of the storage case, the forward movement is transformed into the upward rotation of the display panel about the lower end thereof, so that the display panel is raised. On the other hand, when the display panel is moved into the storage case, the backward movement is transformed into the downward rotation of the display panel about the lower end thereof, so that the display panel is lowered to substantially the horizontal posture and is then received in the storage case.

The upward rotating and downward rotating mechanisms of the display panel in the known monitor system will be described below.

A movable bracket (support member) for rotatably supporting the lower end of the display panel is movably arranged in the fixed case (storage case). Points at which both sides of the lower end of the display panel are supported by the movable bracket will be referred to as first supporting points. The first supporting points are slidably engaged with raising guide portions formed in the fixed case along the length thereof, thus guiding the display panel. In addition, link members (arm members) are provided such that a second supporting point at one end of each link member is rotatably connected to the display panel in a predetermined portion on the side surface of the display panel and a third supporting point at the other end of each link member is slidably engaged with the corresponding restricting guide portion formed in the fixed case along the length thereof.

When the movable bracket supporting the display panel in substantially the horizontal posture is moved forward to move the display panel forward, the third supporting points of the respective link members are guided through the restricting guide portions and are then locked at the ends of the portions. Thus, the forward movement of each link member is stopped. In this state, when the movable bracket is further moved forward, the first supporting points for supporting the display panel are moved through the raising guide portions, so that each restricted link member pivots upward about the third supporting point by the moving force of the first supporting point. The upward pivoting of the link members about the third supporting points upwardly moves the second supporting points, at which the link members are connected to the display panel. Consequently, the lower end of the display panel is moved forward in response to the forward movement of the first supporting points, thus raising the display panel. When the first supporting points, i.e., the lower end of the display panel is further moved forward beyond a position below the second supporting points, the display panel is rotated about the second supporting points. Thus, the display panel is brought into a raised posture such that the display panel can be used.

In the state where the display panel is held in the raised posture, when the movable bracket is moved backward to backwardly move the first supporting points at which the movable bracket supports the display panel, the display panel is rotated downward about the second supporting points in the direction opposite to that in the above-mentioned operation. In addition, each link member also pivots downward about the third supporting point. Consequently, the display panel is brought into substantially the horizontal posture. When the movable bracket is further moved backward, the third supporting points and the restricting guide portions are released from their locked state. Thus, the display panel held in substantially the horizontal posture is received in the fixed case in response to the backward movement of the bracket.

In the above-mentioned monitor system, the display panel can be moved forward, raised, lowered, and moved backward by moving the movable bracket forward and backward (i.e., by a single driving source).

In the above-mentioned monitor system, the link members are pivoted upward about the respective third supporting points at one end thereof to raise the display panel that is rotatably supported at the second supporting points at the other end of the respective link members. Disadvantageously, when the distance between each third supporting point and the corresponding first supporting point, where a force is exerted in the horizontal direction, at the lower end of the display panel is reduced in the thickness direction of the display panel, a large force is required to raise the display panel. In other words, it is necessary to increase a driving force to be generated from the driving source for moving the movable bracket forward or backward.

On the other hand, to reduce the driving force to be generated from the driving source, the distance between each third supporting point, serving as a pivot of each link member, and the corresponding first supporting point at the lower end of the display panel has to be long in the thickness direction of the display panel. Disadvantageously, the thickness of the system is increased because the distance between the pivot of each link member and the lower end of the display panel has to be long.

SUMMARY OF THE INVENTION

The present invention is made to solve the above disadvantages and an object of the present invention is to provide a monitor system having such a structure that a display panel can be rotated upward to a raised posture with a relatively small force without increasing the thickness of the system.

According to the present invention, there is provided a monitor system including: a storage case having an open front end; a display panel operable to move between a predetermined back position located within the storage case and a predetermined front position located in front of the open front end of the storage case, the display panel being received in substantially a horizontal posture at the predetermined back position and being rotatable between the horizontal posture and a raised posture in the vicinity of the predetermined front position; a support member operable to move in the storage case, the support member operable to rotatably support the lower end of the display panel; a driving source operable to move the support member laterally; a first guide associated with the storage case, the first guide extending along a side of the storage case; a second guide operable to move together with the support member; and an arm member having a first supporting point at one end, a second supporting point at the other end, and an intermediate supporting point between the first and second supporting points, the arm member being rotatably connected to the display panel between the upper and lower ends of the display panel via the first supporting point, the arm member being engaged with the first guide via the second supporting point and with the second guide via the intermediate supporting point. The first guide includes a first pivot guide portion operable to guide the second supporting point in a predetermined area in a downward sloping direction relative to the forward moving direction of the support member such that the arm member is rotated in an upward direction about the intermediate supporting point in response to the forward movement of the support member within a first range anterior to an innermost part of the storage case. The second guide includes a restricting portion and a shift allowing portion connected to the restricting portion. The restricting portion restricts the shift of the intermediate supporting point when the second supporting point is shifted within the predetermined area through the first pivot guide portion. The shift allowing portion allows the intermediate supporting point to shift in the support member when the support member is moved forward within a second range in front of the first range while the second supporting point is being locked by the first pivot guide portion after being shifted within the predetermined area. When the support member is moved forward within the first range to rotate the arm member in an upward direction about the intermediate supporting point, the first supporting point is raised such that the display panel is pivoted in an upward direction about the lower end of the display panel by a predetermined angle. When the support member is moved forward within the second range, the display panel is rotated in an upward direction about the first supporting point such that the display panel is raised into the raised posture.

In the above-mentioned structure, when the support member is moved forward from the innermost part of the storage case, the arm member is moved forward together with the support member while the arm member is being engaged with the first guide extending along a side of the storage case through the second supporting point and is also being engaged with the second guide through the intermediate supporting point. When the support member is moved forward within the first range, the second supporting point of the arm member is guided through the first pivot guide portion in the first guide while the shift of the intermediate supporting point is restricted by the restricting portion in the second guide, such that the arm member is rotated upward about the intermediate supporting point. The upward rotation of the arm member about the intermediate supporting point allows the display panel connected to the arm member via the first supporting point to pivot upward about the lower end of the display panel.

When the support member is further moved forward within the second range, the shift allowing portion of the second guide allows the intermediate supporting point of the arm member to shift in the support member while the second supporting point of the arm member is being locked. The support member is moved forward relative to the raised arm member. Thus, the lower end of the display panel is brought to the predetermined front position, so that the display panel is rotated in an upward direction about the first supporting points such that the display panel is brought into the raised posture.

In the monitor system according to the present invention, each first guide may include a linear guide portion connected to the first pivot guide portion. The linear guide portion guides the corresponding second supporting point in parallel to the forward moving direction of the support member when the support member is moved forward in a range between the innermost part of the storage case and the first range.

In this structure, when the support member is moved forward from the innermost part of the storage case, the second supporting point of each arm member is guided through the linear guide portion in the corresponding first guide. The arm members can be stably moved.

In the monitor system according to the present invention, the second supporting point of each arm member may be further engaged with the corresponding second guide. Each second guide may include a second pivot guide portion and a stopping portion connected to the second pivot guide portion. The second pivot guide portion guides the corresponding second supporting point without preventing the shift of the second supporting point when the second supporting point is shifted within the predetermined area through the corresponding first pivot guide portion. The stopping portion prevents the corresponding second supporting point from moving out of the first pivot guide portion when the support member is moved forward in the second range.

In this structure, when the support member is moved forward in the second range, the stopping portion of each second guide can prevent the second supporting point of the corresponding arm member from moving out of the first pivot guide portion. Thus, the display panel can be stably pivoted upward. When the support member is moved forward in the first range and the second supporting point of each arm member is guided through the corresponding first pivot guide portion such that the second supporting point is shifted in the predetermined area, the second supporting point is guided through the second pivot guide portion of the corresponding second guide such that the shift of the second supporting point is not prevented.

In the monitor system according to the present invention, in each second guide, the second pivot guide portion may be formed separately from the stopping portion and the restricting portion may be formed separately from the shift allowing portion. The second pivot guide portion may be connected to the shift allowing portion.

In this structure, in each second guide, the restricting portion, the shift allowing portion, the second pivot guide portion, and the stopping portion can be continuously formed. Thus, the productivity of the monitor system can be improved.

In the monitor system according to the present invention, each first guide may be a component different from the storage case. Alternatively, each first guide may include a groove formed in one side surface of the storage case. The groove is a long hole with a bottom or a long through-hole formed in each side surface of the storage case.

In this structure, the first guides can be easily formed in the storage case as one piece. Thus, the productivity of the monitor system can be further improved.

In the monitor system according to the present invention, each arm member may have a first shaft member as the second supporting point, the first shaft member projecting from the arm member in the thickness direction thereof. The first pivot guide portion in each first guide may include a sloping groove that slopes downward relative to the forward moving direction of the support member. When the support member is moved forward in the first range, each first shaft member may be shifted along the corresponding sloping groove.

In this structure, when the support member is moved forward in the first range, the first shaft member, serving as the second supporting point of each arm member, is engaged with the sloping groove, serving as the corresponding first pivot guide portion, and is reliably guided. Thus, the arm members can be stably rotated upward about the respective intermediate supporting points.

In the monitor system according to the present invention, each second guide may be a component different from the support member. Alternatively, each second guide may include a groove formed in one side surface of the support member. The groove is a long hole with a bottom or a through-hole formed in each side surface of the support member.

In this structure, the second guides can be easily formed in the support member as one piece. Thus, the productivity of the monitor system can be further improved.

Preferably, the groove width of the restricting portion in each second guide is smaller than that of the shift allowing portion.

As mentioned above, in each second guide, the restricting portion for restricting the shift of the intermediate supporting point in the corresponding arm member and the shift allowing portion for allowing the shift of the intermediate supporting point can be formed with such a simple structure that one groove has different groove widths.

In the monitor system according to the present invention, each arm member may have a second shaft member as the intermediate supporting point. The second shaft member projects from the arm member in the thickness direction thereof. When the support member is moved forward in the first range, each second shaft member is fitted into the restricting portion in the corresponding second guide such that the second shaft member is brought into a restricted state, and when the support member is moved forward in the second range, the second shaft member is shifted into the shift allowing portion in the second guide such that the restricted state is released.

In this structure, the second shaft member, serving the intermediate supporting point of each arm member, is selectively shifted between the restricting portion with a small width and the shift allowing portion with a large width in accordance with the moving range of the support member. Thus, each intermediate supporting point can be switched between the restricted state and a released state in such a simple structure.

In the monitor system according to the present invention, preferably, each first guide includes a groove formed in one side surface of the storage case and each second guide includes a groove formed in one side surface of the support member.

In this structure, the first guides can be easily formed in the storage case as one piece and the second guides can be easily formed in the support member as one piece. Thus, the productivity of the monitor system can be further improved.

In the monitor system according to the present invention, each arm member may have a first shaft member as the second supporting point. The first shaft member projects from the arm member in the thickness direction thereof. One end of the first shaft member may be inserted into the corresponding first guide and the other end thereof may be inserted into the corresponding second guide.

In this structure, each first guide, to which the end of the corresponding first shaft member is inserted, and the corresponding second guide, to which the other end thereof is inserted, can be arranged such that the first and second guides face each other, with the corresponding arm member therebetween. Thus, the thickness of the monitor system can be reduced.

In the monitor system according to the present invention, the first pivot guide portion in each first guide may include a sloping groove that slopes downward relative to the forward moving direction of the support member. When the support member is moved forward in the first range, one end of each first shaft member may be shifted along the corresponding sloping groove.

In this structure, when the support member is moved forward in the first range, one end of the first shaft member, serving as the second supporting point of each arm member, is engaged with the sloping groove, serving as the corresponding first pivot guide portion, and is reliably guided. Thus, the arm members can be stably rotated upward about the respective intermediate supporting points.

In the monitor system according to the present invention, preferably, when the support member is moved forward or backward in a range between the innermost part of the storage case and the first range, each arm member is moved forward or backward in substantially the horizontal posture together with the display panel.

Since each arm member is allowed to move forward or backward in substantially the horizontal posture together with the display panel, the thickness of the monitor system can be reduced.

In the monitor system according to the present invention, preferably, when the support member is moved forward or backward in a range between the innermost part of the storage case and the first range, each arm member is located adjacent to the corresponding side of the display panel so as to fit within the thickness thereof.

Since each arm member is allowed to move forward or backward adjacent to the corresponding side of the display panel so as to fit within the thickness of the display panel, the thickness of the monitor system can be reduced.

In the monitor system according to the present invention, when the support member is moved forward in the first range anterior to the innermost part of the storage case, the second supporting point of each arm member is guided through the first pivot guide portion in the corresponding first guide, so that the arm members are rotated upward about the respective intermediate supporting points. Each arm member is connected to the display panel in a predetermined portion between the upper and lower ends of the display panel through the first supporting point. The upward rotation of the arm members allows the display panel to pivot upward about the lower end of the display panel. Since the load of the display panel is applied to the first supporting points at the ends of the respective arm members and the second supporting points at the other ends are guided such that each arm member is rotated about the intermediate supporting point, a force required to rotate the arm members can be reduced as compared to the case where the arm members are rotated about the respective ends. In addition, since the range of rotation of each arm member can be set such that the display panel is raised not completely but to some extent, a range to guide each second supporting point depending on the rotation range of the arm member can be relatively reduced.

In addition, when the support member is moved forward in the second range in front of the first range, the shift allowing portion in each second guide allows the intermediate supporting point of each arm member to shift in the support member. Consequently, the support member is moved forward relative to the arm members raised as mentioned above, so that the display panel is rotated upward about the respective first supporting points. Advantageously, a relatively small forward moving force of the support member is sufficient to rotate the display panel upward. In the monitor system according to the present invention, therefore, the display panel can be brought into the raised posture with a relatively small force without increasing the thickness of the system.

DESCRIPTION OF THE PREFERRED EMBODIMENTS

An embodiment of the present invention will now be described with reference to the drawings.

Figure 1:
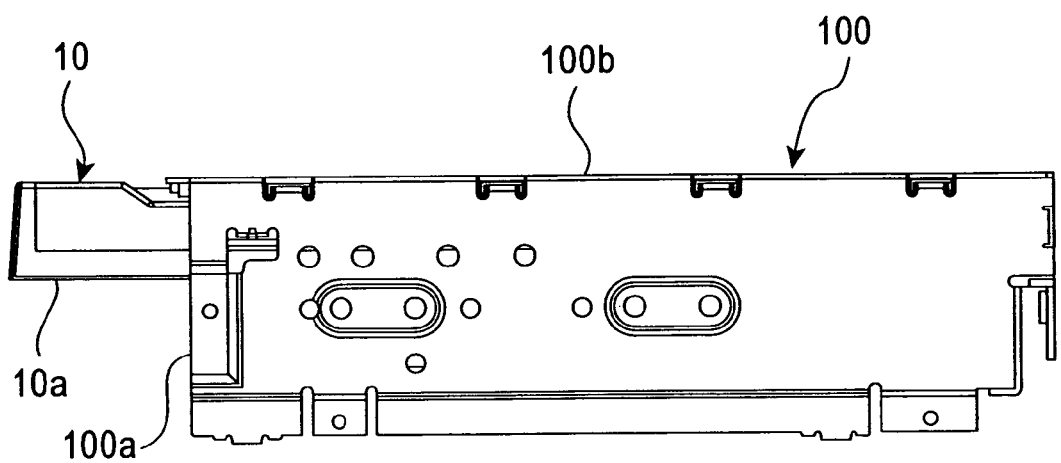
FIG. 1 is a side plan view of a monitor system according to an embodiment of the present invention, a display panel included in the monitor system being received in a storage case.
Figure 2:
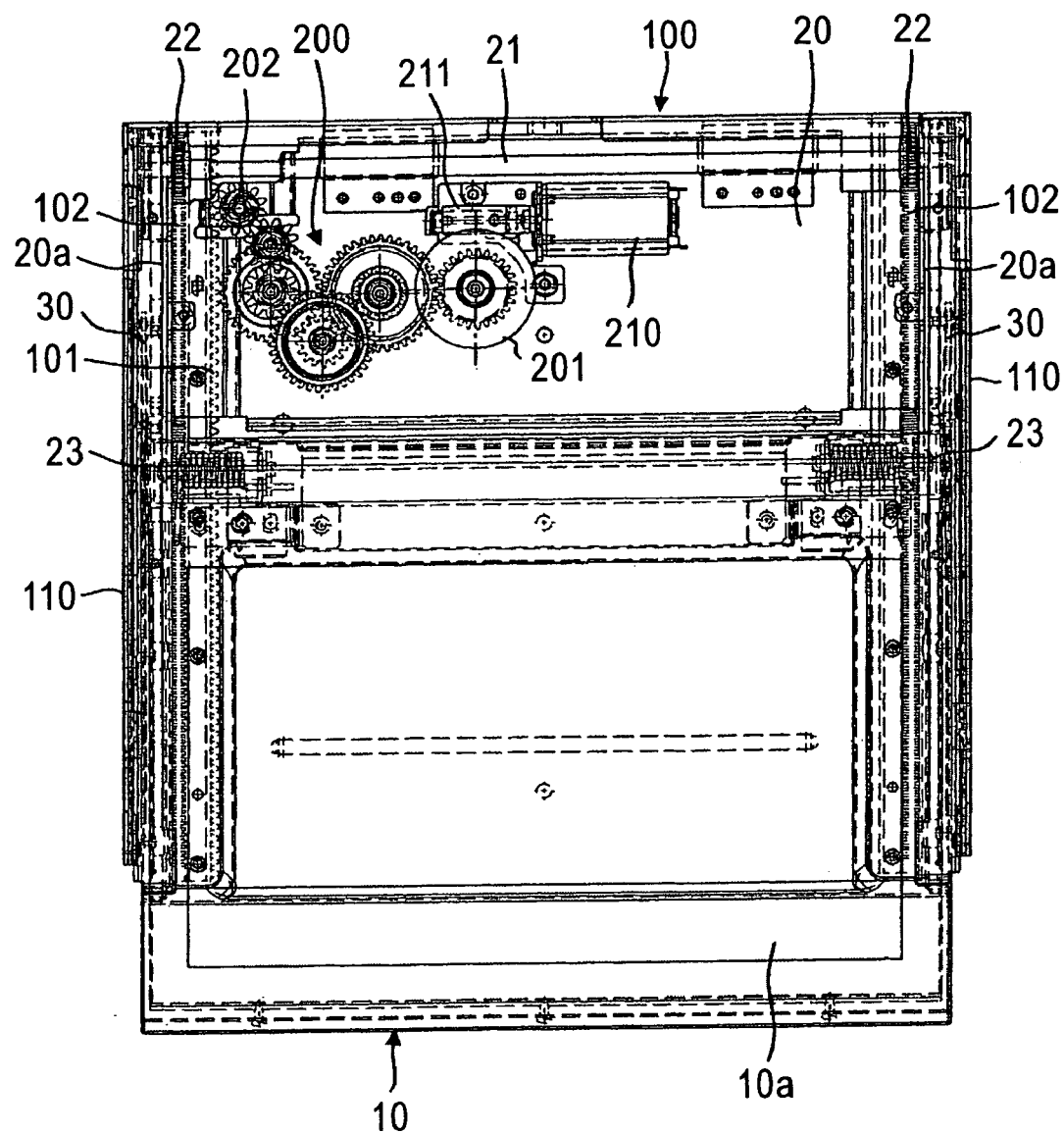
FIG. 2 is a bottom plan view of the monitor system according to the embodiment, the display panel being received in the storage case.

Referring to FIGS. 1 and 2, a monitor system according to the present embodiment includes a storage case 100 with an opening 100*a* at the front end. A support chassis (support member) 20 is movably disposed in the storage case 100. Both the side surfaces of the lower end of a display panel 10 are connected to the ends of the side surfaces of the support chassis 20 through pivot support pins 23, respectively, in such a manner that the support chassis 20 pivotably supports the lower end of the display panel 10. When the support chassis 20 is located in the innermost part of the storage case 100, the support chassis 20 supports the display panel 10 in substantially a horizontal posture such that a display screen 10*a* faces down (i.e., in the downward direction in FIG. 1 and in the upward direction perpendicular to the drawing sheet of FIG. 2). At that time, the display panel 10 is completely received in the storage case 100, i.e., the display panel 10 is located in a predetermined storage position (predetermined back position) such that the upper end of the display panel 10 (in FIG. 2, the lower end) is exposed from the opening 100*a* of the storage case 100. A frame-shaped decorated panel (not shown) is attached to the opening 100*a* of the storage case 100 so that the upper end of the display panel 10 in the predetermined storage position is not projected from the front end of the decorated panel.

A first rack 101 is fixed to the inner surface of a top plate 100*b* of the storage case 100 such that the first rack 101 is adjacent to one side plate (i.e., a guide plate 110 which will be described below) and the tooth surface of the first rack 101 faces the inside of the storage case 100. The first rack 101 extends along the length of the storage case 100 (i.e., in the lateral direction in FIG. 1 and in the longitudinal direction in FIG. 2). Second racks 102 are fixed to both the ends of the inner surface of the top plate 100*b* such that the tooth surface of each second rack 102 faces down (i.e., in the upward direction perpendicular to the drawing sheet of FIG. 2). The second racks 102 extend along the length of the storage case 100. A shaft 21 is rotatably attached to the rear end of the support chassis 20. The shaft 21 extends along the width of the support chassis 20. Gears 22 are arranged at both ends of the shaft 21, respectively. Each gear 22 engages with the corresponding second rack 102.

Figure 3:
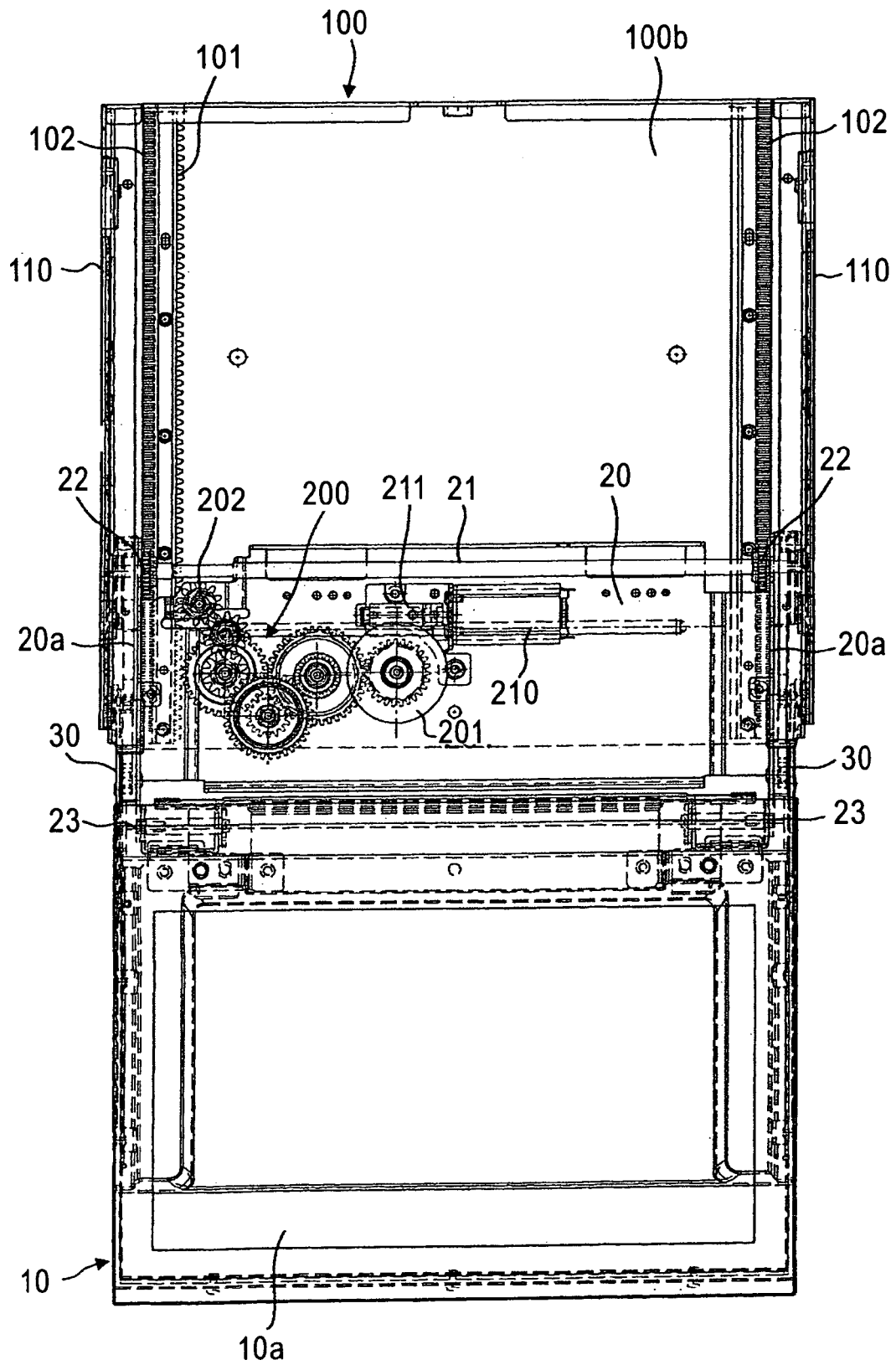
FIG. 3 is a bottom plan view of the monitor system according to the embodiment, the display panel being projected out of the storage case just before being pivoted upward.
Figure 4:
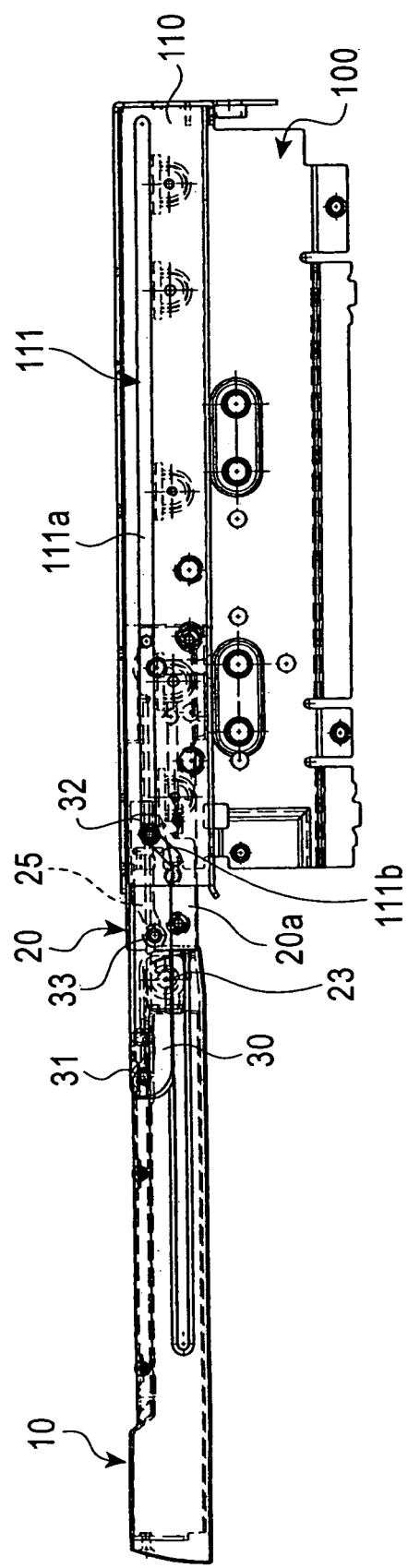
FIG. 4 is a side plan view of the monitor system according to the embodiment, the display panel being in the state of FIG. 3.

A driving motor 210 and a gear train 200 are mounted on the support chassis 20. A gear (worm gear) 211, attached to the rotating shaft of the driving motor 210, engages with a gear 201 located at one end of the gear train 200. A gear 202, located at the other end of the gear train 200, engages with the first rack 101. The driving motor 210 (gear 211), the gear train 200, and the first rack 101 constitute a mechanism for moving the support chassis forward or backward. When the driving shaft of the driving motor 210 rotates in a predetermined direction, the rotation is transmitted to the gear 202 engaging with the first rack 101 through the gear 211 and the gear train 200. The support chassis 20 is moved forward by a forward moving force caused by the rotation of the gear 202 engaging with the first rack 101, while being guided by the gears 22 which rotate in engagement with the respective second racks 102. Consequently, as shown in FIGS. 3 and 4, the support chassis 20 is projected out of the opening 100*a* of the storage case 100. When the driving motor 210 rotates in the opposite direction, the rotation is similarly transmitted to the gear 202. While being guided by the gears 22 which rotate in engagement with the respective second racks 102, the support chassis 20 is moved backward toward the innermost part of the storage case 100 by a backward moving force caused by the rotation of the gear 202 engaging with the first rack 101 as shown in FIGS. 1 and 2. In this instance, the innermost part means a limit position of the movement of the support chassis 20 toward the rear of the storage case 100 (i.e., in the upward direction in FIG. 2). It is unnecessary to move the support chassis 20 backward to the innermost end of the storage case 100.

Figure 5:
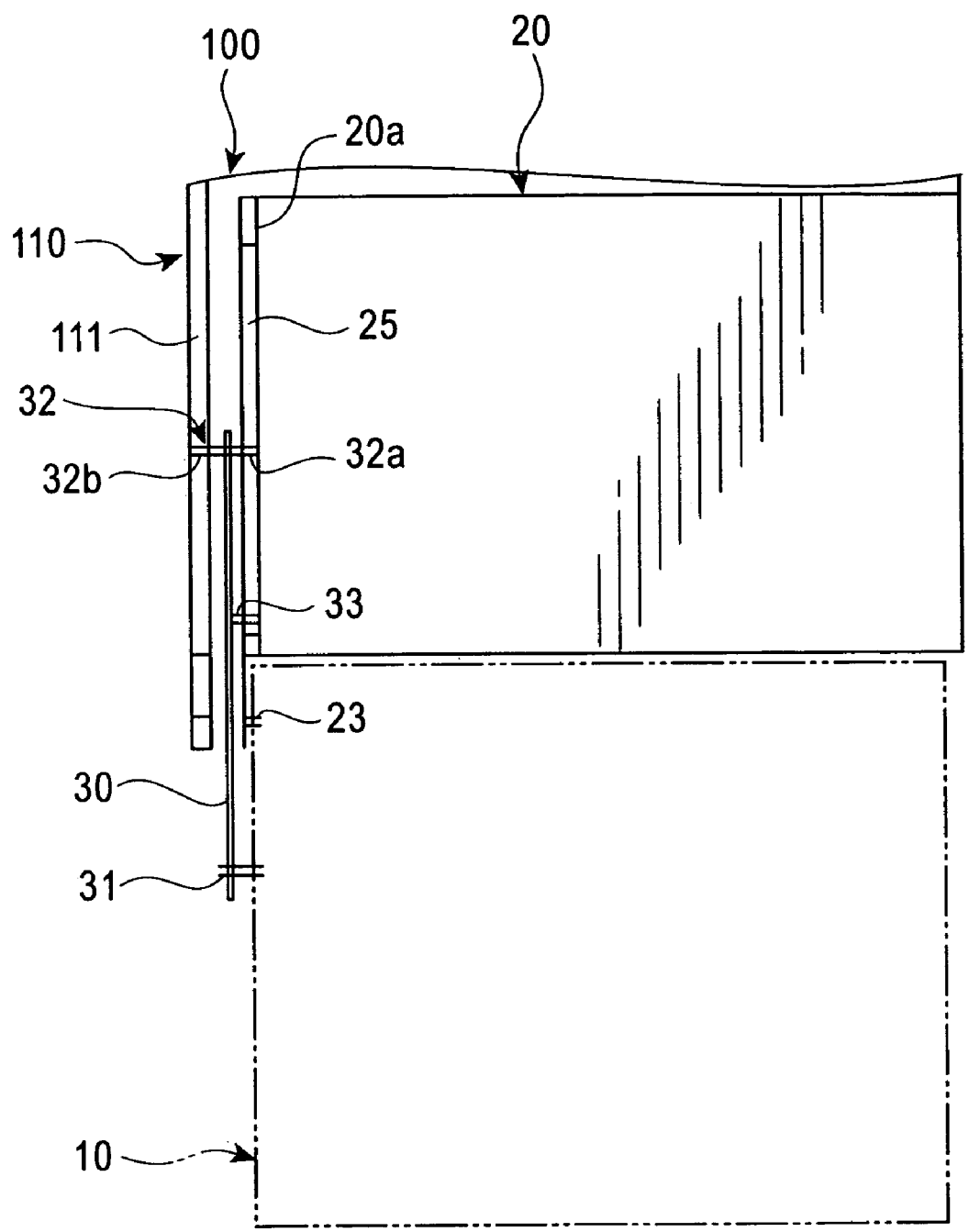
FIG. 5 schematically shows the engagement between an arm, a guide plate, a support chassis, and the display panel.

As shown in FIGS. 1 to 4, an arm member 30 is arranged between the support chassis 20 and each guide plate 110 (also refer to FIGS. 9 and 13 which will be described below), serving as a side plate of the storage case 100. As shown in FIGS. 4 and 5, each arm member 30 is engaged with the corresponding guide plate 110, the corresponding side plate 20*a* of the support chassis 20, and the display panel 10.

Referring to FIGS. 4 and 5, a pin 31 (first supporting point) projects from both the side surfaces of the display panel 10 such that the pin 31 is located between the corresponding pivot support pin 23 and the upper end (front part) of the display panel 10. Each pin 31 rotatably engages with the front end of the corresponding arm member 30. A roller pin (first shaft member) 32, serving as a second supporting point, projects from both sides of the rear end of each arm member 30 in the thickness direction thereof. In addition, an intermediate roller pin (second shaft member) 33, serving as an intermediate supporting point, projects toward the support chassis 20 from a predetermined intermediate position between each roller pin 32 and the engagement position of each pin 31 with the corresponding arm member 30. A lock guide groove 111, serving as a first guide, is formed in each guide plate 110 such that the groove 111 extends along the length of the plate 110. A shift guide groove 25, serving as a second guide, is formed in each side plate 20a of the support chassis 20 such that the groove 25 faces the lock guide groove 111 in the corresponding guide plate 110. The outer end 32b of the roller pin 32 in each arm member 30 is slidably inserted into the corresponding lock guide groove 111 and the inner end 32a thereof is inserted into the corresponding shift guide groove 25. The intermediate roller pin 33 in each arm member 30 is also inserted into the corresponding shift guide groove 25. Instead of the lock guide grooves 111 and the shift guide grooves 25, a slot may be formed as a guide in each of the guide plates 110 and the side plates 20a of the support chassis 20. Alternatively, a guide groove may be formed in a separate member made of synthetic resin or metal and the member with the guide groove may be fixed to each of the guide plates 110 and the side plates 20a. Each of the above-mentioned slots and guide grooves may have a bottom or may be a through-hole.

Figure 6A:
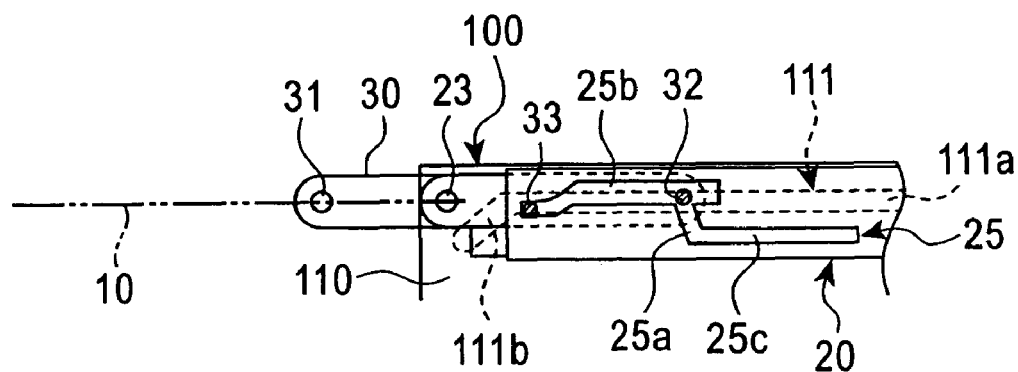
FIG. 6A schematically shows the form of a lock guide groove and that of a shift guide groove.
Figure 6B:
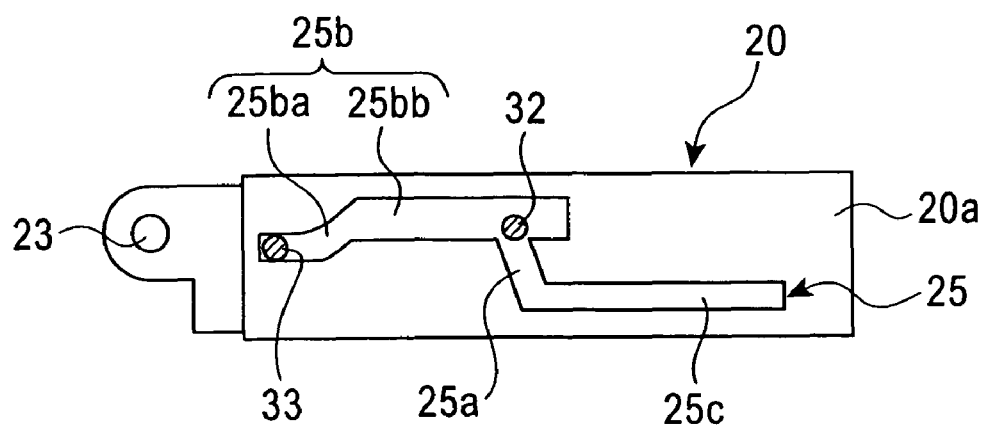
FIG. 6B schematically shows the detailed form of the shift guide groove.

As shown in FIGS. 4 and 6A, the lock guide groove 111 formed in each guide plate 110 includes a linear groove segment 111a, serving as a linear guide portion, and a sloping groove segment 111b, serving as a first pivot guide portion. The linear groove segment 111a extends in the moving direction of the support chassis 20. The sloping groove segment 111b extends from the front end of the linear groove segment 111a and slopes downward relative to the forward moving direction of the support chassis 20. As shown in detail in FIG. 6B, the shift guide groove 25, formed in each side plate 20a of the support chassis 20, includes a first guide groove segment 25a, serving as a second pivot guide portion, a second guide groove segment 25b, and a third guide groove segment 25c, serving as a stopping portion.

Figure 7:
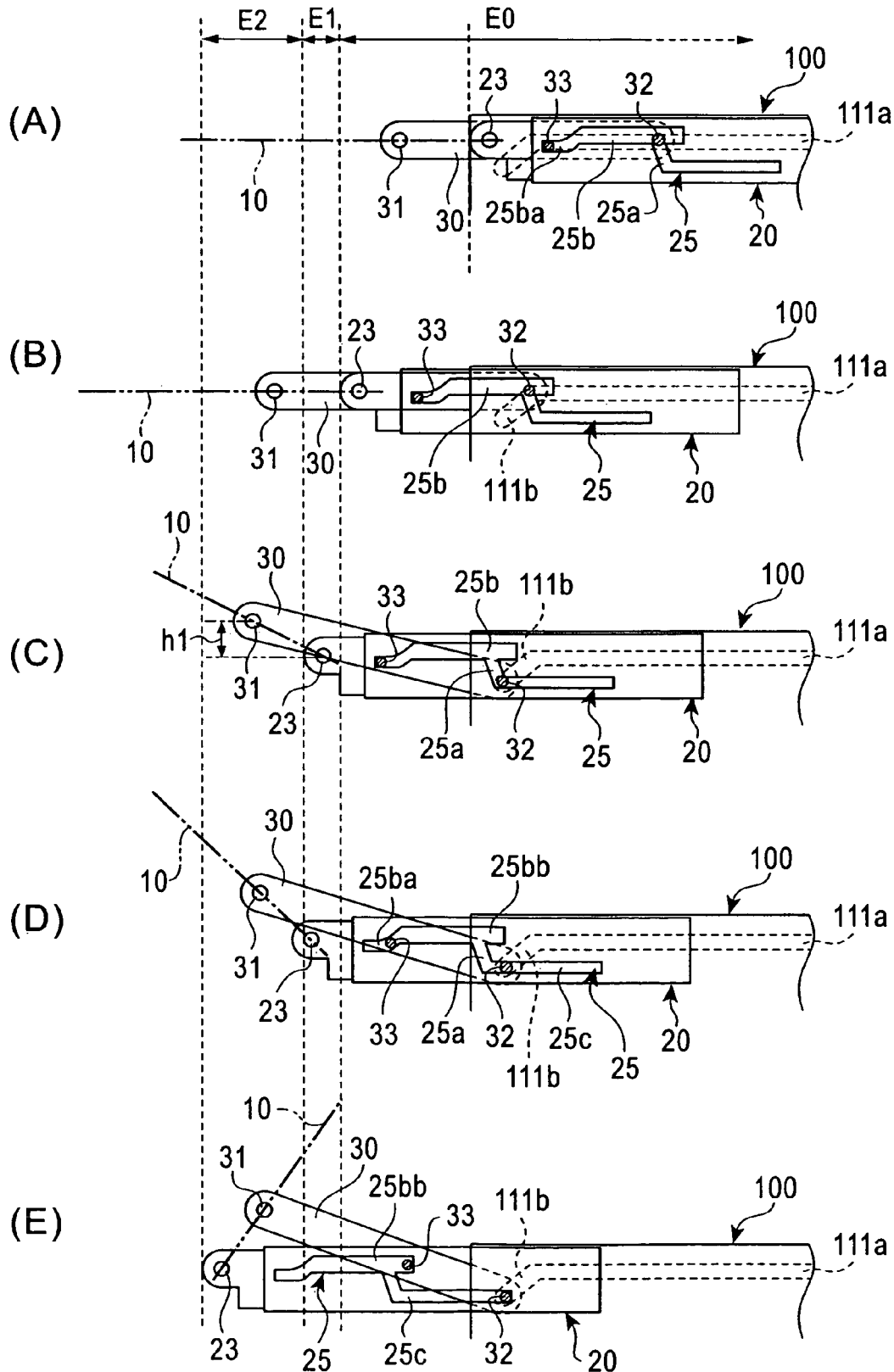
FIG. 7 includes parts (A) to (E), each part schematically showing the movements of each arm member and the display panel operatively associated with the forward or backward movement of the support chassis with respect to moving ranges of the support chassis.

The first guide groove segment 25a slopes as shown in parts (B) and (C) of FIG. 7. The first guide groove segment 25a is formed so as to correspond to a path of the shift of the roller pin 32 in the corresponding side plate 20a of the support chassis 20, the roller pin 32 being guided through the sloping groove segment 111b of the lock guide groove 111 when the support chassis 20 is moved forward or backward. When the support chassis 20 is moved forward or backward, therefore, the shift of each roller pin 32 guided through the sloping groove segment 111b of the lock guide groove 111 is not prevented. In response to the movement of the support chassis 20, each roller pin 32 is guided through the first guide groove segment 25a, serving as the second pivot guide portion, of the corresponding shift guide groove 25 which moves together with the support chassis 20.

Each second guide groove segment 25b is formed so as to connect to the upper end of the first guide groove segment 25a and extend in the moving direction of the support chassis 20. Each second guide groove segment 25b includes a linear portion 25bb, serving as a shift allowing portion, and a sloping portion 25ba, serving as a restricting portion. Each linear portion 25bb is parallel to the moving direction of the support chassis 20. Each sloping portion 25ba extends from the linear portion 25bb. The width of the linear portion 25bb of each second guide groove segment 25b is set such that the corresponding intermediate roller pin 33 is loosely fitted into the linear portion 25bb. The width of the sloping portion 25ba is smaller than that of the linear portion 25bb such that the intermediate roller pin 33 can be fitted into the sloping portion 25ba. Each third guide groove segment 25c, serving as the stopping portion, connects to the lower end of the first guide groove segment 25a and extends therefrom in parallel to the linear portion 25bb of the second guide groove segment 25b.

The operation of projecting and raising the display panel 10 and the operation of lowering and receiving the display panel 10 in the monitor system with the above-mentioned structure will now be described with reference to FIGS. 7 to 14. In FIG. 7, moving ranges E0 to E2 are defined relative to the front end of the support chassis 20.

The operation of projecting and raising the display panel 10 is performed as follows.

The above-mentioned forward/backward moving mechanism (including the driving motor 210, the gear train 200, and the first rack 101) moves the support chassis 20 forward to the opening 100a of the storage case 100 from the innermost part thereof. In the forward movement of the support chassis 20 in the moving range E0 between the innermost part of the storage case 100 shown in part (A) of FIG. 7 and a predetermined front position in front of the storage case 100 shown in part (B) of FIG. 7, each intermediate roller pin 33 engaging with the corresponding shift guide groove 25 is come into contact with the front end of the sloping portion 25ba in the second guide groove segment 25b, thus restricting the movement of each arm member 30. In this state, while the inner end 32a of each roller pin 32 fitting into the corresponding shift guide groove 25 is being located in the connecting point between the second guide groove segment 25b and the first guide groove segment 25a, the arm members 30 are moved forward together with the support chassis 20. In this instance, the outer end 32b of the roller pin 32 of each arm member 30 is guided through the linear groove segment 111a of the corresponding lock guide groove 111, so that the arm members 30 are held substantially parallel to the display panel 10. In addition, each pin 31, serving as the first supporting point, connecting the corresponding arm member 30 with the display panel 10 is located at substantially the same level (in the longitudinal direction in FIG. 7) as that of the pivot support pin 23 connecting the support chassis 20 with the lower end of the display panel 10. Each arm member 30 is located adjacent to the corresponding side of the display panel 10 within the thickness of the display panel 10 (see FIG. 4). The display panel 10 rotatably supported by the support chassis 20 through the pivot support pins 23 is moved forward together with the support chassis 20 in substantially the horizontal posture. The horizontal posture means a state in which the display panel 10 is substantially parallel to the top plate 100b of the storage case 100.

When the support chassis 20 reaches the boundary between the moving range E0 and the subsequent moving range E1 (referred to a first range), as shown in part (B) of FIG. 7, the outer end 32b of the roller pin 32 in each arm member 30, which moves together with the support chassis 20, reaches the boundary between the linear groove segment 111a and the sloping groove segment 111b in the lock guide groove 111 (refer to FIG. 4). When the support chassis 20 is further moved forward in the moving range E1, the outer end 32b of the roller pin 32 in each arm member 30 is guided through the sloping groove segment 111b of the lock guide groove 111. While the outer end 32b of the roller pin 32 is being guided through the sloping groove segment 111b (first pivot guide portion), the inner end 32a of the roller pin 32 is guided through the first guide groove segment 25a (second pivot guide portion) of the shift guide groove 25 in the support chassis 20 without being prevented from moving. As shown in part (C) of FIG. 7, the outer end 32b of the roller pin 32 is shifted along the sloping groove segment 111b by a predetermined distance, so that the outer end 32b reaches the front end of the sloping groove segment 111b. Simultaneously, the inner end 32a reaches the boundary between the first guide groove segment 25a and the third guide groove segment 25c in the shift guide groove 25.

Figure 8:
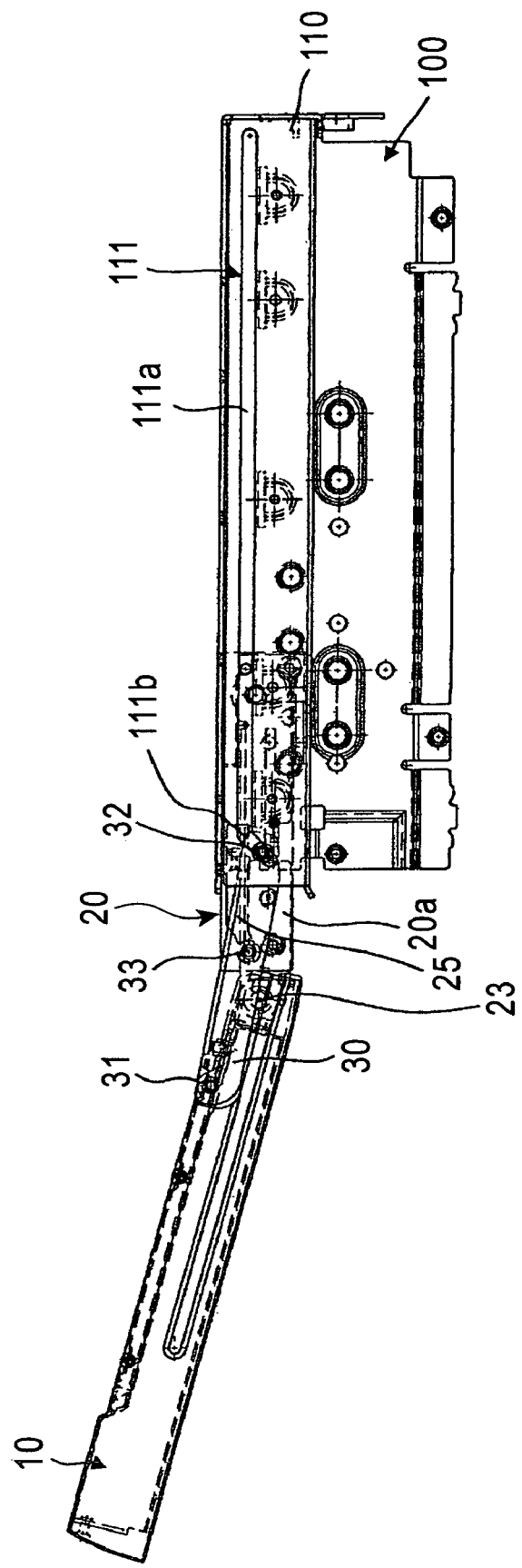
FIG. 8 is a side plan view of the monitor system just after each arm member is moved upward.
Figure 9:
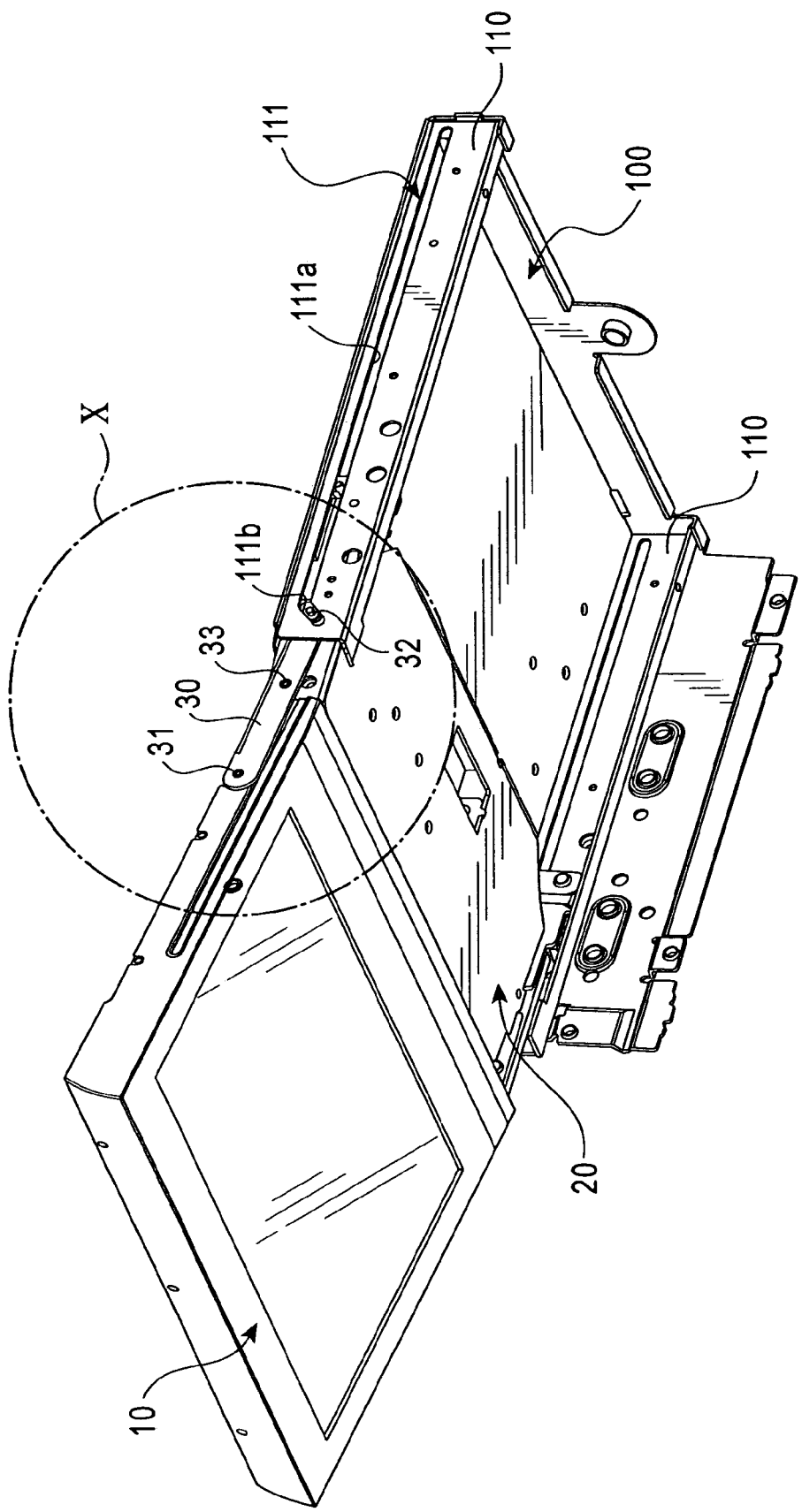
FIG. 9 is a perspective view of the monitor system in the state as that of FIG. 8 as viewed from below.
Figure 10:
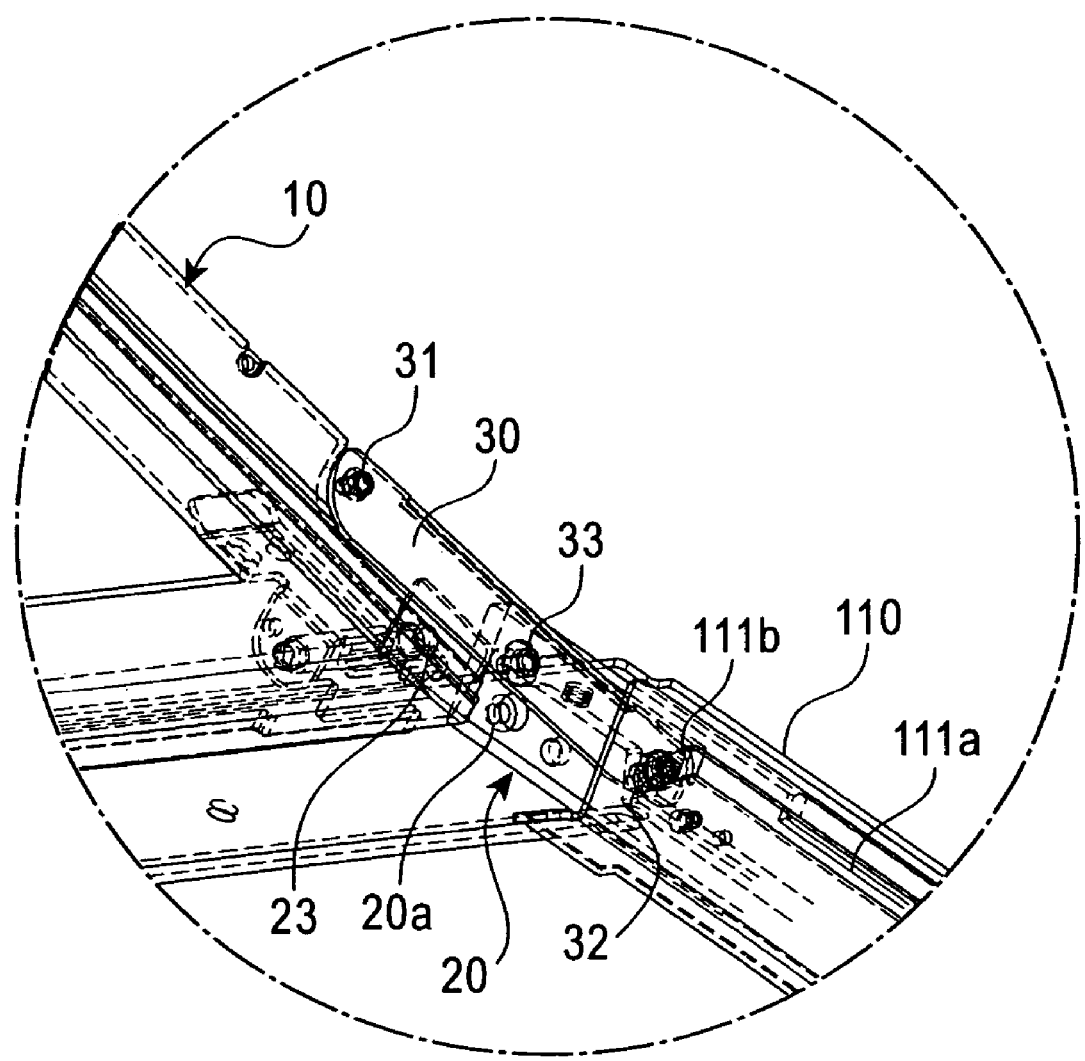
FIG. 10 is a detail view of part X of FIG. 9.

The outer end 32b of the roller pin 32 (second supporting point) arranged at the rear end of each arm member 30 is guided through the sloping groove segment 111b of the lock guide groove 111 and the inner end 32a of the roller pin 32 is guided through the first guide groove segment 25a in the shift guide groove 25, thus pressing the roller pin 32 downward. Consequently, each arm member 30 is moved forward together with the support chassis 20 and is simultaneously rotated about the intermediate roller pin 33, restricted at the end of the sloping portion 25ba of the second guide groove segment 25b in the shift guide groove 25 such that the arm member 30 is raised (rotated clockwise in FIG. 7). FIGS. 8 to 10 specifically show the states of the arm member 30 and the display panel 10 at that time.

As shown in FIGS. 8 to 10, when each arm member 30 is rotated upward about the intermediate roller pin 33 (intermediate supporting point), the front end of the arm member 30, which the pin 31 (first supporting point) extending from the side surface of the display panel 10 is rotatably engaged with, is raised. Thus, the display panel 10 is pivoted upward about the pivot support pins 23, which rotatably couple the lower end of the display panel 10 with the front end of the support chassis 20. Consequently, as shown in part (C) of FIG. 7, a difference h1 in longitudinal level is ensured between each pin 31 (first supporting point) and the corresponding pivot support pin 23 by the rotation of the corresponding arm member 30.

As mentioned above, when the outer end 32b of each roller pin 32 reaches the front end of the sloping groove segment 111b in the corresponding lock guide groove 111 (see part (C) of FIG. 7), the lateral shift of the roller pin 32 is restricted, thus preventing the further forward movement of the corresponding arm member 30. In this state, when the support chassis 20 is moved forward in the moving range E2 following the moving range E1, the support chassis 20 is moved forward relative to the arm members 30. In the initial movement, while the difference h1 in longitudinal level is kept between each pivot support pin 23 and the corresponding pin 31, the lower end of the display panel 10 supported by the pivot support pins 23 is moved forward (straight) together with the support chassis 20. Each pivot support pin 23 serves as the connecting point between the support chassis 20 and the display panel 10. Each pin 31 serves as the connecting point between the corresponding arm member 30 and the display panel 10. Consequently, the display panel 10 starts rotating about the pins 31 (first supporting points) to the raised posture. At that time, an upward force is applied to the front end of each arm member 30 with which the corresponding pin 31 is engaged, so that the arm member 30 is slightly pivoted upward about the corresponding roller pin 32 (second supporting point) at the rear end thereof. When the support chassis 20 is moved forward relative to the arm members 30 slightly pivoted about the roller pins 32 as mentioned above, as shown in part (D) of FIG. 7, the intermediate roller pin 33 in each arm member 30 enters the corresponding linear portion (shift allowing portion) 25bb from the sloping portion (restricting portion) 25ba of the second guide groove segment 25b in the corresponding shift guide groove 25 of the support chassis 20. The inner end 32a of the roller pin 32 in each arm member 30 enters the third guide groove segment 25c of the corresponding shift guide groove 25.

When the support chassis 20 is further moved forward from a position shown in part (D) of FIG. 7, the intermediate roller pin 33 of each arm member 30 enters the linear portion 25bb from the sloping portion 25ba of the second guide groove segment 25b in the corresponding shift guide groove 25 of the support chassis 20. Simultaneously, the inner end 32a of the roller pin 32 in each arm member 30 is continuously guided through the third guide groove segment (stopping portion) 25c of the corresponding shift guide groove 25. Consequently, the outer end 32b of each roller pin 32 is prevented from moving out of the front end of the sloping groove segment (first pivot guide) 111b in the corresponding lock guide groove 111, thus keeping the arm member 30 in the raised posture. In that movement, the front end (i.e., the pin 31) of each arm member 30 is slightly rotated upward about the roller pin 32 at the rear end thereof until the corresponding pivot support pin 23 is positioned directly below the pin 31 in response to the forward (straight) movement of the support chassis 20. When the pivot support pin 23 is moved forward beyond the position directly below the pin 31, the front end (i.e., the pin 31) of each arm member 30 is slightly rotated downward about the roller pin 32. The behavior of the intermediate roller pin 33 associated with the slight upward and downward rotating motion of the front end of each arm member 30 is absorbed by a gap between the intermediate roller pin 33 and the linear portion 25bb (shift allowing portion) of the second guide groove segment 25b in the corresponding shift guide groove 25.

As mentioned above, when the support chassis 20 is moved forward in the moving range E2, the intermediate roller pin 33 and the roller pin 32 in each arm member 30 are relatively guided through the second guide groove segment 25b and the third guide groove segment 25c in the corresponding shift guide groove 25 which is moved together with the support chassis 20. Thus, as shown in part (E) of FIG. 7, the intermediate roller pin 33 and the roller pin 32 reach the ends of the segments 25b and 25c, respectively.

Figure 11:
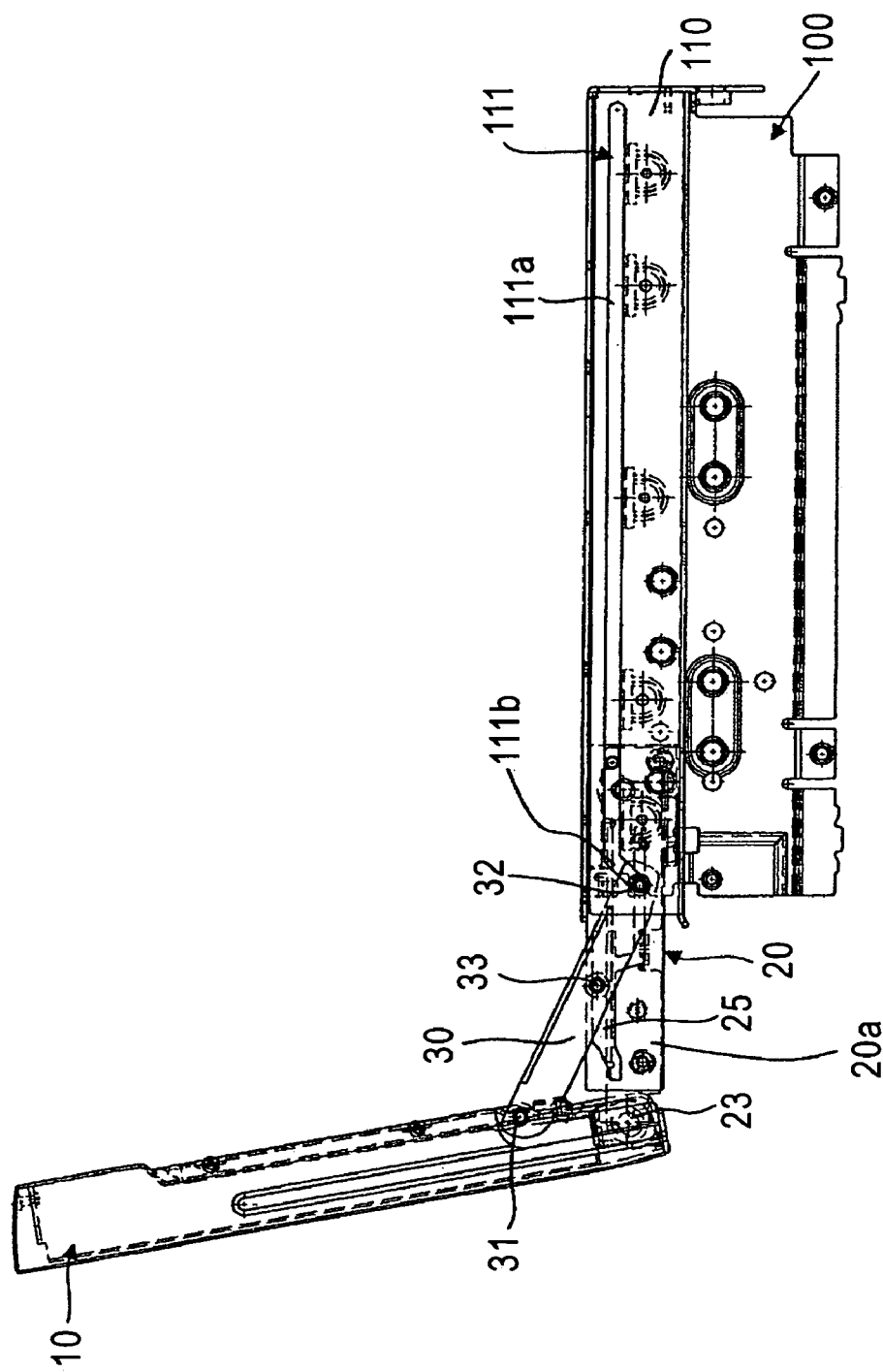
FIG. 11 is a side plan view of the monitor system in which the display panel is rotated upward by the forward movement of the support chassis.
Figure 12:
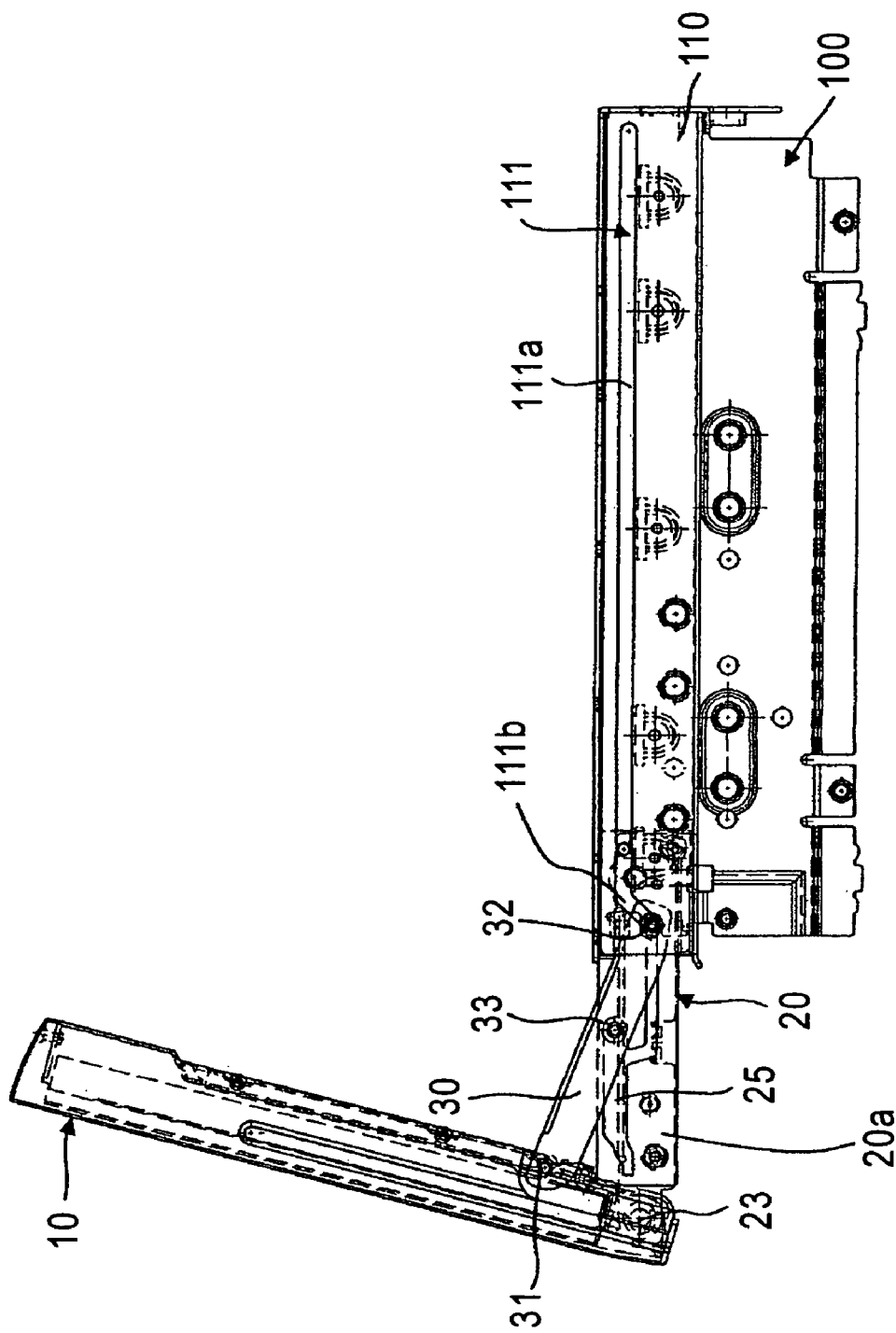
FIG. 12 is a side plan view of the monitor system in which the display panel is set in a raised posture in which movement display panel is available.

FIGS. 11 to 14 specifically show the relationship between the arm member 30 and the display panel 10 when the support chassis 20 is moved forward in the moving range E2. FIG. 11 shows the respective states of the arm member 30 and the display panel 10 when the support chassis 20 is moved forward. FIG. 12 shows the respective states of the arm member 30 and the display panel 10 when the forward movement of the support chassis 20 is completed.

Figure 13:
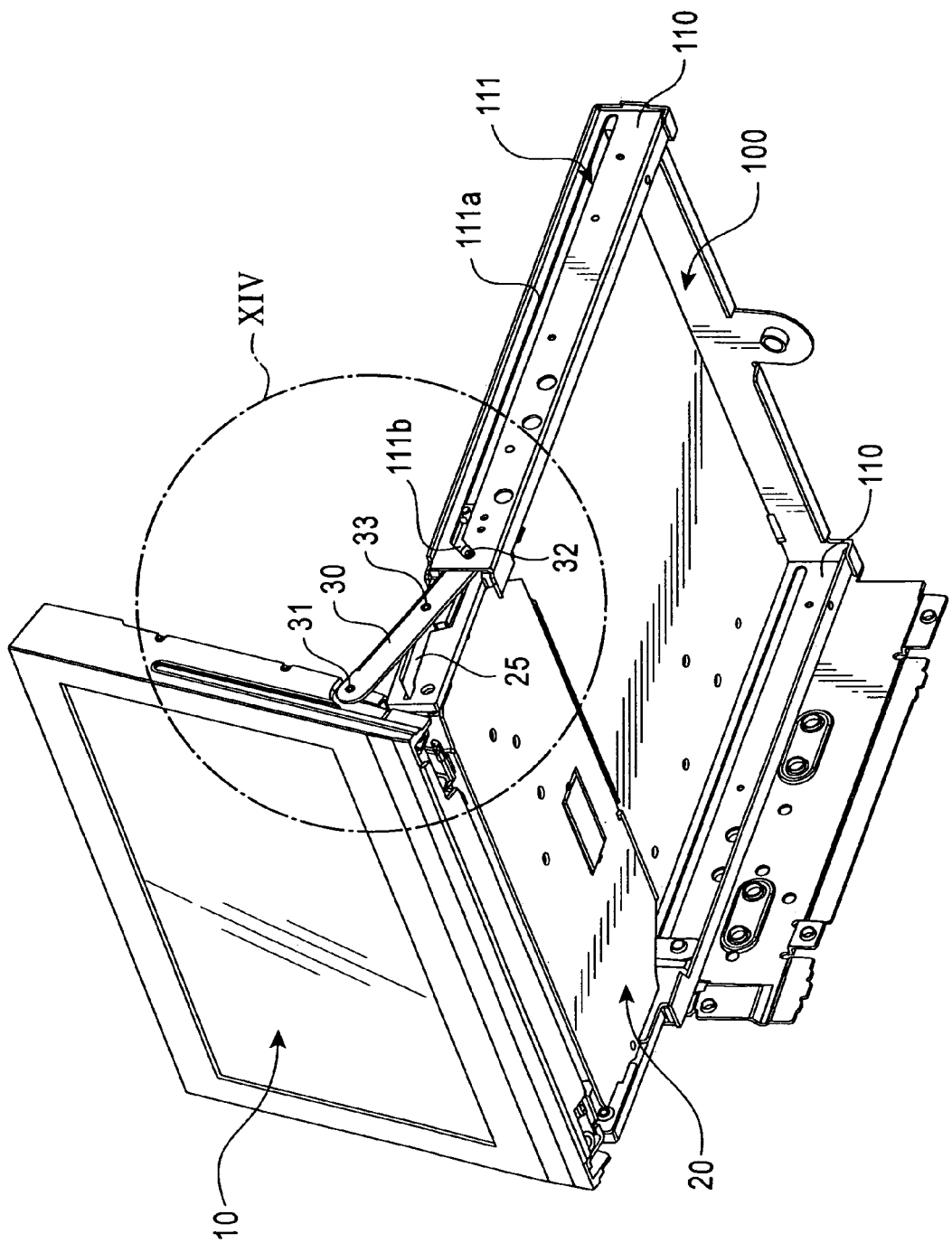
FIG. 13 is a perspective view of the monitor system in the state of FIG. 12 as viewed from below.
Figure 14:
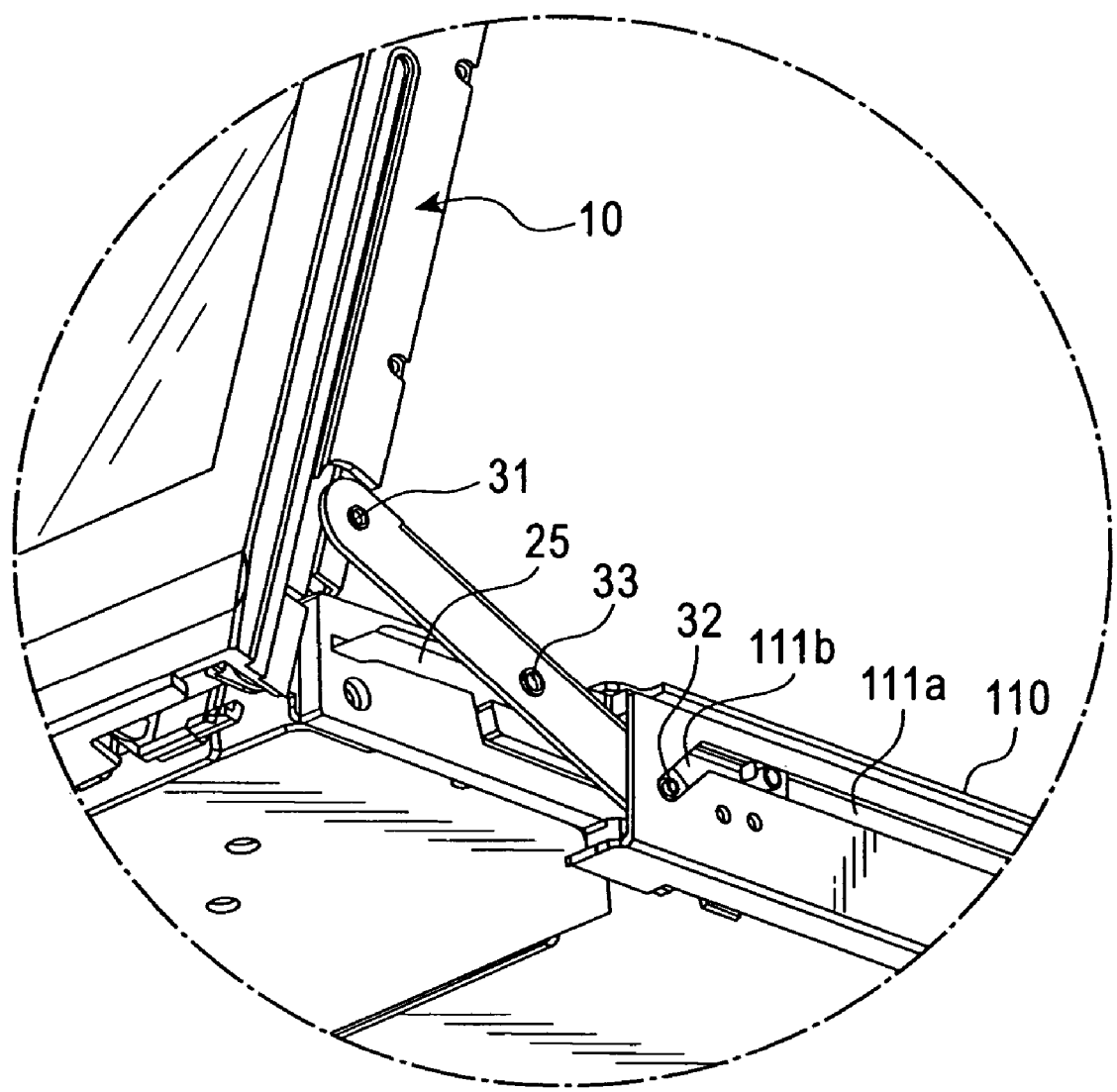
FIG. 14 is a detail view of part XIV of FIG. 13.

As shown in FIG. 11, when the support chassis 20 is moved forward while the raised posture of each arm member 30 is being kept, the lower end of the display panel 10 rotatably supported by the front end of the support chassis 20 is brought forward. Thus, the display panel 10 is rotated upward about the pins 31 supported in the front ends of the respective arm members 30 (refer to part (D) of FIG. 7). While the support chassis 20 is being further moved forward, the display panel 10 is further rotated upward about the pins 31. As shown in FIGS. 12 to 14, when each pivot support pin 23, serving as the connecting point between the front end of the support chassis 20 and the lower end of the display panel 10, reaches a predetermined position in front of the position directly below the pin 31, serving as the arm member 30 and the display panel 10 (see part (E) of FIG. 7), the rotation of the driving motor 210 (constituting the forward/backward moving mechanism) is stopped on the basis of a detection signal output from a predetermined sensor (not shown), thus stopping the forward movement of the support chassis 20. Consequently, the display panel 10 is set in the raised posture with a tilt angle, defined by the positional relationship between the lower end (the pivot support pins 23) of the display panel 10 and the supporting points (the pins 31) in the arm members 30, such that the display panel 10 can be used (refer to FIGS. 12 and 13).

The operation of lowering the display panel 10 from the raised posture and receiving the display panel is performed as follows.

The driving motor 210, included in the forward/backward moving mechanism, is rotated in the opposite direction to move the support chassis 20 backward in the moving range E2. At that time, while the intermediate roller pin 33 and the roller pin 32 in each arm member 30 are being guided in the direction opposite to the above-mentioned direction through the second guide groove segment 25b and the third guide groove segment 25c in the corresponding shift guide groove 25 of the support chassis 20, the arm member 30 is maintained in the raised posture. When the lower end (i.e., the pivot support pins 23) of the display panel 10 is moved backward in response to the backward movement of the support chassis 20, the display panel 10 is rotated reversely (i.e., downward) about the supporting points (the pins 31) at the front ends of the arm members 30 maintained in the raised posture (refer to parts (E), (D), and (C) of FIG. 7 and FIGS. 12, 11, and 8 in that order).

After that, when the support chassis 20 is moved backward in the moving range E1 following the moving range E2, each intermediate roller pin 33, which is in contact with the front end of the sloping portion 25ba of the second guide groove segment 25b in the corresponding shift guide groove 25 of the support chassis 20, is brought backward, so that the arm members 30 and the support chassis 20 are moved backward together. Consequently, the roller pin 32 at the rear end of each arm member 30 is guided in the direction opposite to the above-mentioned direction through the sloping groove segment 111b of the corresponding lock guide groove 111 and the first guide groove segment 25a of the corresponding shift guide groove 25, so that the arm member 30 is rotated reversely (i.e., downward) about the intermediate roller pin 33 (see parts (C) and (B) of FIG. 7 in that order). Consequently, the display panel 10 raised by the front ends (the pins 31) of the arm members 30 is lowered while being pivoted about the pivot support pins 23 (see FIGS. 8 and 4). Then, each of the display panel 10 and the arm members 30 is brought into substantially the horizontal posture, so that the pins 31 and the pivot support pins 23 are located at substantially the same level.

In this state, when the support chassis 20 is moved backward to the innermost part (i.e., the movement limit position) of the storage case 100 (see part (A) of FIG. 7), the display panel 10 is moved backward to the predetermined storage position. When the predetermined sensor (not shown) detects the arrival of the support chassis 20 at the innermost part, the rotation of the driving motor 210 is stopped, thus stopping the backward movement of the support chassis 20. Consequently, the display panel 10 is received in substantially the horizontal posture in the storage case 100 (refer to FIGS. 1 and 2).

In the monitor system according to the present embodiment, when the support chassis 20 is moved forward in the moving range E1, each arm member 30 is rotated about the intermediate roller pin 33, serving as the supporting point, so as to rise from substantially the horizontal posture. Thus, the predetermined difference hi in longitudinal level (in the thickness direction of the display panel 10) is ensured between each pin 31, serving as the rotation supporting point for the display panel 10, and the corresponding pivot support pin 23, at which a pivoting force is applied to the display panel 10. Advantageously, the forward moving force of the support chassis 20 (i.e., the torque of the driving motor 210) necessary to raise the display panel 10 may be relatively small. In addition, the arm members 30 and the display panel 10 can be held horizontally in the moving range E0. Accordingly, the arm members 30 can be arranged within the thickness of the display panel 10. The range of pivoting of each arm member 30 can be set such that the display panel 10 is raised not completely but to some extent. Advantageously, the range of shift of each supporting point (roller pin 32) depending on the pivoting range of the arm member 30 can be relatively reduced. In addition, when the support chassis 20 is moved forward or backward in the moving range E2 following the moving range E1, each arm member 30 is not significantly pivoted. Each arm member 30 is controlled so as to keep its raised posture with a predetermined change in tilt. Advantageously, a force necessary to pivot each arm member 30, which the load of the display panel 10 is applied to, can be minimized.

In the monitor system according to the present embodiment of the present invention, the display panel 10 can be rotated to the raised posture with a relatively small force without increasing the thickness of the system. In addition, the display panel 10 can be moved forward and backward, rotated from the horizontal posture to the raised posture, and rotated from the raised posture to the horizontal posture by the power of the single driving motor 210. Advantageously, the system can be reduced in size and cost.

As mentioned above, the monitor system according to the present invention has advantages in that the display panel can be rotated to the raised posture with a relatively small force without increasing the thickness of the system. Accordingly, the present invention can be usefully applied to monitor systems each having a display panel received in substantially a horizontal posture in a storage case, the display panel being projected out of the front open end of the storage case, being pivoted to a raised posture, and being used in the raised posture.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A monitor system comprising:
  a storage case having an open front end;
  a display panel operable to move between a predetermined back position located within the storage case and a predetermined front position located in front of the open front end of the storage case, the display panel capable of being received in substantially a horizontal posture at the predetermined back position and rotatable between the horizontal posture and a raised posture in the vicinity of the predetermined front position;
  a support member operable to move within the storage case, the support member operable to rotatably support a lower end of the display panel;
  a driving source operable to move the support member laterally;
  a first guide associated with the storage case, the first guide extending along a side of the storage case;

a second guide operable to move together with the support member; and an arm member having a first supporting point at one end, a second supporting point at the other end, and an intermediate supporting point between the first and second supporting points, the arm member being rotatably connected to the display panel at a point between an upper end and the lower end of the display panel via the first supporting point, the arm member being engaged with the first guide via the second supporting point and the second guide via the intermediate supporting point, wherein the first guide comprises a first pivot guide portion operable to guide the second supporting point within a predetermined area in a downward sloping direction relative to a forward moving direction of the support member such that the arm member is rotated in an upward direction about the intermediate supporting point in response to the forward movement of the support member within a first range anterior to an innermost part of the storage case, the second guide comprising a restricting portion and a shift allowing portion connected to the restricting portion, the restricting portion restricting the shift of the intermediate supporting point when the second supporting point is shifted within the predetermined area through the first pivot guide portion, the shift allowing portion operable to allow the intermediate supporting point to shift within the support member when the support member is moved forward within a second range in front of the first range while the second supporting point is being locked by the first pivot guide portion after being shifted within the predetermined area, when the support member is moved forward within the first range to rotate the arm member in an upward direction about the intermediate supporting point, the first supporting point is raised such that the display panel is pivoted in an upward direction about the lower end of the display panel by a predetermined angle, and when the support member is moved forward within the second range, the display panel is rotated in an upward direction about the first supporting point such that the display panel is raised into the raised posture.

2. The monitor system according to claim 1, wherein the first guide comprises a linear guide portion connected to the first pivot guide portion, the linear guide portion operable to guide the second supporting point parallel to the forward moving direction of the support member when the support member is moved forward within a range between the innermost part of the storage case and the first range.

3. The monitor system according to claim 1, wherein
the second supporting point is engaged with the second guide, and
the second guide comprises a second pivot guide portion and a stopping portion connected to the second pivot guide portion, the second pivot guide portion operable to guide the second supporting point without preventing the shift of the second supporting point when the second supporting point is shifted within the predetermined area through the first pivot guide portion, the stopping portion preventing the second supporting point from moving out of the first pivot guide portion when the support member is moved forward within the second range.

4. The monitor system according to claim 3, wherein the second pivot guide portion is connected to the shift allowing portion.

5. The monitor system according to claim 1, wherein the first guide comprises a groove formed in a side surface of the storage case.

6. The monitor system according to claim 5, wherein
the second supporting point is a first shaft member, the first shaft member projecting from the arm member in the thickness direction of the arm member,
the first pivot guide portion comprises a sloping groove that slopes downward relative to the forward moving direction of the support member, and
when the support member is moved forward within the first range, the first shaft member is shifted along the sloping groove.

7. The monitor system according to any one of claims 1 to 4, wherein the second guide comprises a groove formed in a side surface of the support member.

8. The monitor system according to claim 7, wherein a groove width of the restricting portion is smaller than a groove width of the shift allowing portion.

9. The monitor system according to claim 8, wherein
the intermediate supporting point is a second shaft member, the second shaft member projecting from the arm member in the thickness direction of the arm member,
when the support member is moved forward within the first range, the second shaft member is fitted into the restricting portion in the second guide such that the second shaft member is moved into a restricted state, and
when the support member is moved forward within the second range, the second shaft member is shifted into the shift allowing portion of the second guide such that the second shaft member is released from the restricted state.

10. The monitor system according to claim 1, wherein
the first guide comprises a groove formed in a side surface of the storage case, and
the second guide comprises a groove formed in a side surface of the support member.

11. The monitor system according to claim 10, wherein
the second supporting point is a first shaft member, the first shaft member projecting from the arm member in the thickness direction of the arm member,
one end of the first shaft member being insertable into the first guide, and
the other end of the first shaft member being insertable into the second guide.

12. The monitor system according to claim 11, wherein
the first pivot guide portion comprises a sloping groove that slopes downward relative to the forward moving direction of the support member, and
when the support member is moved forward within the first range, one end of the first shaft member is shifted along the sloping groove.

13. The monitor system according to claim 12, wherein a groove width of the restricting portion is smaller than a groove width of the shift allowing portion.

14. The monitor system according to claim 13, wherein
the intermediate supporting point is a second shaft member, the second shaft member projecting from the arm member in the thickness direction of the arm member,
when the support member is moved forward within the first range, the second shaft member is fitted into the restricting portion in the second guide such that the second shaft member is moved into a restricted state, and
when the support member is moved forward within the second range, the second shaft member is shifted into the shift allowing portion of the second guide such that the second shaft member is released from the restricted state.

15. The monitor system according to claims 1, wherein when the support member is moved forward or backward within a range between the innermost part of the storage case and the first range, the arm member is moved forward or backward in substantially the horizontal posture together with the display panel.

16. The monitor system according to claims 1, wherein when the support member is moved forward or backward within a range between the innermost part of the storage case and the first range, the arm member is located adjacent to the corresponding side of the display panel so as to fit within a thickness of the display panel.

17. A monitor system comprising:
a storage case having an open front end;
a display panel operable to move between a predetermined back position located within the storage case and a predetermined front position located in front of the open front end of the storage case, the display panel capable of being received in substantially a horizontal posture at the predetermined back position and rotatable between the horizontal posture and a raised posture in the vicinity of the predetermined front position;
a support member operable to move within the storage case, the support member operable to rotatably support a lower end of the display panel;
a driving source operable to move the support member laterally;
a first guide associated with the storage case, the first guide extending along a side of the storage case;
a second guide operable to move together with the support member; and
an arm member having a first supporting point at one end, a second supporting point at the other end, and an intermediate supporting point between the first and second supporting points, the arm member being rotatably connected to the display panel between an upper end and the lower end of the display panel via the first supporting point, the arm member being engaged with the first guide via the second supporting point and the second guide via the intermediate supporting point, wherein
the first guide comprises a first pivot guide portion operable to guide the corresponding second supporting point within a predetermined area in a downward sloping direction relative to the forward moving direction of the support member such that the arm member is rotated in an upward direction about the intermediate supporting point in response to the forward movement of the support member within a first range anterior to an innermost part of the storage case,
the second guide comprises a restricting portion and a shift allowing portion connected to the restricting portion, the restricting portion restricting the shift of the corresponding intermediate supporting point when the second supporting point is shifted within the predetermined area through the first pivot guide portion, the shift allowing portion being operable to allow the intermediate supporting point to shift in the support member when the support member is moved forward within a second range in front of the first range while the second supporting point is being locked by the first pivot guide portion after being shifted within the predetermined area,
when the support member is moved forward or backward within a range between the innermost part of the storage case and the first range, the arm member is located adjacent to the corresponding side of the display panel so as to fit within the thickness of the display panel,
when the support member is moved forward within the first range to rotate the arm member in an upward direction about the intermediate supporting point, the first supporting point is raised such that the display panel is pivoted in an upward direction about the lower end of the display panel by a predetermined angle, and
when the support member is moved forward within the second range, the display panel is rotated about the first supporting point such that the display panel is raised into the raised posture.

18. The monitor system according to claim 17, wherein when the support member is moved forward or backward within the range between the innermost part of the storage case and the first range, the arm member is moved forward or backward in substantially the horizontal posture together with the display panel.

19. A monitor system comprising:
a storage case having an open front end;
a display panel operable to move between a predetermined back position located within the storage case and a predetermined front position located in front of the open front end of the storage case, the display panel being received in substantially a horizontal posture at the predetermined back position and rotatable between the horizontal posture and a raised posture in the vicinity of the predetermined front position;
a support member operable to move within the storage case, the support member being operable to rotatably support a lower end of the display panel;
a driving source operable to move the support member laterally;
a first guide associated with the storage case, the first guide extending along the storage case;
a second guide operable to move together with the support member; and
an arm member having a first supporting point at one end, a second supporting point at the other end, and an intermediate supporting point between the first and second supporting points, the arm member being rotatably connected to the display panel between an upper end and the lower end of the display panel through the first supporting point, the arm member being engaged with the first guide through the second supporting point and with the second guide through the intermediate supporting point, wherein
the first guide comprises a first pivot guide portion operable to guide the second supporting point within a predetermined area in a downward sloping direction relative to the forward moving direction of the support member such that the arm member is rotated in an upward direction about the intermediate supporting point in response to the forward movement of the support member within a first range anterior to an innermost part of the storage case,
the second guide comprises a restricting portion that restricts the shift of the intermediate supporting point when the second supporting point is shifted within the predetermined area through the first pivot guide portion,
when the support member is moved forward within the first range to shift the second supporting point in the predetermined area through the first pivot guide portion, the second supporting point is locked by the first pivot guide portion, the arm member is rotated in an upward direction about the intermediate supporting point, and the first supporting point is raised such that the display panel is pivoted in an upward direction about the lower end of the display panel by a predetermined angle, and when the support member is moved forward within the second range, the display panel is rotated in an upward direction about the first supporting point such that the display panel is raised into the raised posture.

20. The monitor system according to claim 19, wherein when the support member is moved forward or backward within a range between the innermost part of the storage case and the first range, the arm member is moved forward or backward in substantially the horizontal posture together with the display panel.

21. The monitor system according to claim 19, wherein when the support member is moved forward or backward within a range between the innermost part of the storage case and the first range, the arm member is located adjacent to a corresponding side of the display panel so as to fit within the thickness of the display panel.

* * * * *